United States Patent [19]

Steck, III

[11] Patent Number: 5,690,370

[45] Date of Patent: Nov. 25, 1997

[54] FISHERMAN'S KNOT TYING DEVICE

[75] Inventor: William F. Steck, III, Stamford, Conn.

[73] Assignee: Outdoor Scientific, Inc., Stamford, Conn.

[21] Appl. No.: 782,749

[22] Filed: Jan. 13, 1997

[51] Int. Cl.$^6$ ................................................. B65H 69/04
[52] U.S. Cl. ..................................................... 289/17
[58] Field of Search .............................. 289/1.5, 2, 5, 15, 289/17, 18.1

[56] References Cited

U.S. PATENT DOCUMENTS

| | | | |
|---|---|---|---|
| 1,452,906 | 4/1923 | Butler et al. | 289/17 |
| 2,469,037 | 5/1949 | Harvey | 289/17 |
| 2,498,920 | 2/1950 | Holland | 289/17 |
| 2,502,751 | 4/1950 | Roberts | 289/17 |
| 2,773,713 | 12/1956 | Smalley | 289/17 |
| 2,825,592 | 3/1958 | Semple | 289/17 |
| 3,606,405 | 9/1971 | Lally | 289/17 |
| 3,713,680 | 1/1973 | Pagano | 289/17 |
| 3,787,081 | 1/1974 | Macy | 289/17 |
| 3,873,140 | 3/1975 | Bloch | 289/17 |
| 4,400,025 | 8/1983 | Dennison | 289/17 |
| 5,240,295 | 8/1993 | Spencer | 289/17 |

*Primary Examiner*—Michael A. Neas

[57] ABSTRACT

A hand-held hot-tying device used for forming fishermen's knots, such as blood knots, which are used to tie two fishing lines segments together. The device is flat with a base from which three spaced-apart legs extend at right angles. The device may be formed from an assembly consisting of congruent plates which are fastened together adjacently. The adjacent spaced-apart legs of the assembly provide three sets of two nips into which the fishing line is wedged and held fast. The top portion of each nip is tapered so as to facilitate insertion of the fishing line segments. While one free end of line to be joined remains held fast, the free end of the other is manipulated on the device and then clamped to the center legs. Then the free end of the other line to be joined is likewise manipulated and clamped to the center legs. Following both aforesaid line manipulations, the preliminary knot loop formed by the manipulations is manually lifted above the center legs of the plates and the lines are pulled tight to form a completed knot.

6 Claims, 4 Drawing Sheets

FISHERMAN'S KNOT TYING DEVICE

TECHNICAL FIELD

This invention is a device for manually tying fisherman's knots, such as the blood knot. The blood knot, because of its special attributes, is the knot preferred by fishermen for tying together segments of monofilament line. It is small, strong, and renders alignment between the two monofilment segments being tied together. However, the blood knot is difficult to tie only the use of ones hands.

BACKGROUND ART

Two common situations require the use of blood knots. The first is in the construction of leaders. Leaders are relatively short, free lengths of line that are tied to the end of the much longer, thicker principal line that is wound around a fishing reel. Leaders are used because they are very free and hence much more difficult for fish to see than the thicker principal line. Typically leaders comprise several monofilament segments of different diameter tied together in a sequence that produces a taper. A common example of a leader would be one nine feet long comprising a 0.020 inch diameter segment of monofilament at the thick end, a 0.004 inch segment at the free end, and four or five intervening segments of different diameter. Fishermen often make a supply of several leaders before fishing season. Thus, one occasion on which blood knots are used is before the fisherman begins to fish.

A second common situation requiring the use of blood knots is while the fisherman is on a stream and the end of the leader currently in use becomes snarled, or otherwise damaged, in which case the fisherman cuts off the spoiled end and replaces it with a new segment of monofilament. This is difficult to do while out on the stream. Fine diameter monofilament is a challenge to manage while seated at a table with the aid of clamps, but when one is at the side of a stream, or standing in a stream, or toward dark when it is difficult to see, the assistance of a blood knot tying device could be deemed essential.

Blood knot tying devices exist in the prior art, but many of the prior devices are too complex and would be costly to manufacture. Others of the prior art, while not complex, would simply be difficult to use.

U.S. Pat. No. 4,400,025, granted to R. R. Dennison describes a leader tying vise device which is currently being marketed through sporting goods stores and by mail order. The Dennison device has several drawbacks, which are as follows: First, the device has spaced-apart clamps each of which holds both monofilament segments being tied together adjacently. Thus, when one segment is freed from its clamped position, as necessary during the tying process, the other segment might unintentionally comes loose as well. Another drawback of the aforementioned patent is that the tying process requires the fisherman to separate adjacent monofilament segments with the point of what is referred to in the patent as the "tool". This can be difficult with or without 20/20 vision and in any case toward dawn or dusk. Another drawback occurs after twisting the monofilament segments around each other with the "tool", as required when using the Dennison device, because the "tool" must be held by hand while the free end of one monofilament segment is threaded through the loop formed by the twist. Following this, the end just threaded through the loop has to be held by hand while the other free end is also threaded through the loop formed by the twist. Then both ends just threaded through the loop must be held by hand while the knot is drawn tight. While the aforementioned free ends could be clamped into the device's lever mechanism as an alternative to holding them, that alternative would risk setting loose the other ends of the monofilament being held by the device's clamping mechanism. This could undo the whole process. The procedures required by the Dennison device become more and more difficult as the monofilament segments being tied together decrease in diameter, because as monofilament decrease in diameter it become increasing more and more limp and increasingly more difficult to manage.

It would be desirable to provide a knot-tying device which is easier to use and not prone to the difficulties described above.

It would be desirable to provide a knot-tying device which is easier to use and not prone to the difficulties described above.

DISCLOSURE OF THE INVENTION

This invention relates to a device which is simple to manufacture; is effective in tying a blood knot; and is easy to use. The ease of manufacture of the device is due to the fact that it comprises only three flat plates which are simply sandwiched together. Identically contoured, these plates are preferable fastened together by rigid shrink plastic tubing, which is readily available from industrial suppliers. The outer plates, which are identical, are fabricated by stamping them from readily available sheet metal stock. The inner plate if preferable injection molded from plastic such as polycarbonate. The device is easy to use and does not require unusual dexterity to produce perfect knots, even under "standing-in-stream" conditions.

It is therefore the object of this invention to provide an improved blood knot tying device.

These and other objects and advantages of this invention will become more apparent from the drawings herein and the detailed description of the preferred embodiment.

DETAILED DESCRIPTION OF THE INVENTION

Figure 1:
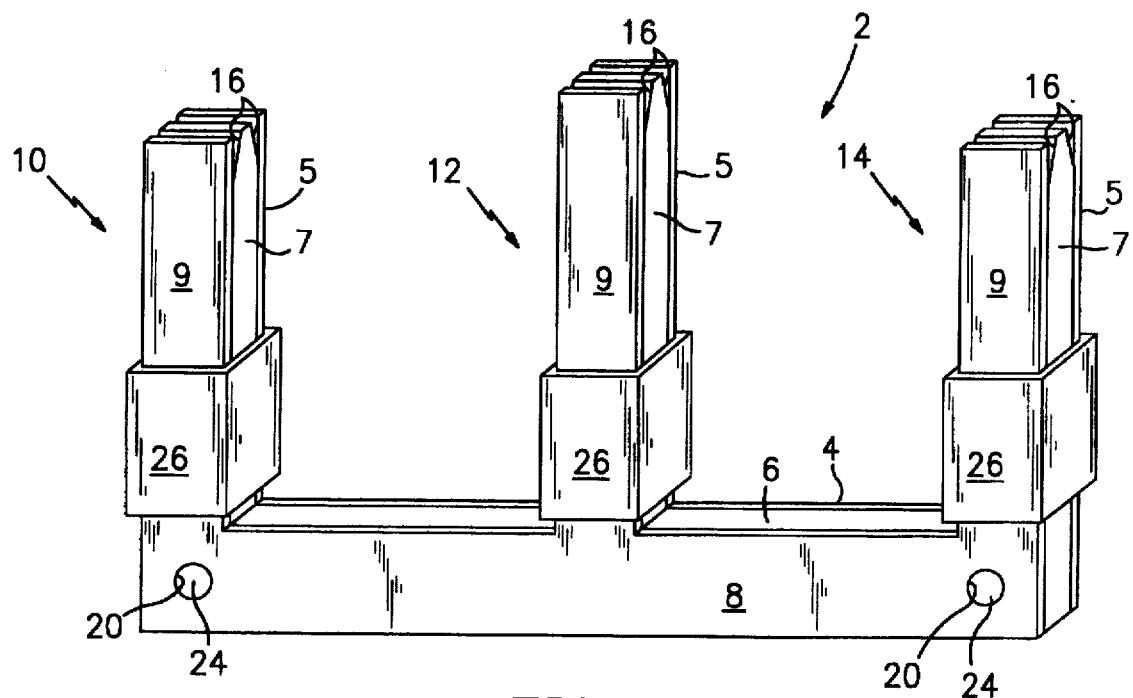
FIG. 1 is a perspective view of the preferred embodiment of a knot tying device made in accordance with this invention.

Referring now to FIG. 1, the preferred embodiment of this invention is shown. It is denoted generally by the numeral 2. The device 2 consists of three plates 4, 6 and 8. The plates 4 and 8, made of relatively thin but stiff material such as 0.025 inch stainless steel, are identical and include three flat legs 5 and 9. The size of the device is preferably about three and one-half inches long and two inches high. The plate 6 has three legs 7 and has the same general contour as the plates 4 and 8. The plate 6 is preferably, but not necessarily, thicker than the plates 4 and 8. The plate 6 does not require the stiffness of the plates 4 and 8, and is preferably constructed of plastic material such as polycarbonate. The device 2 has three legs 10, 12 and 14. The legs 7 on the center plate 6 are tapered or rounded on both sides of their free ends, as at 16, so as to facilitate the insertion of the monofilament segments into the device 2 during the knot tying process, as will be shown in detail subsequently. The extra thickness of the plate 6 provides a larger area of tapered surface, thus further facilitating the insertion of monofilament segments into the device 2 during the knot tying process. The plates 4 and 8 are slightly bowed in the manufacturing process to create a permanent bias operable to urge the free ends of their legs 5 and 9 against the plate legs 7, once the device 2 is assembled. This creates an operative spring-like clamping action between the plate legs 5, 7 and 9, which is necessary to the proper functioning of the device 2.

Figure 2:
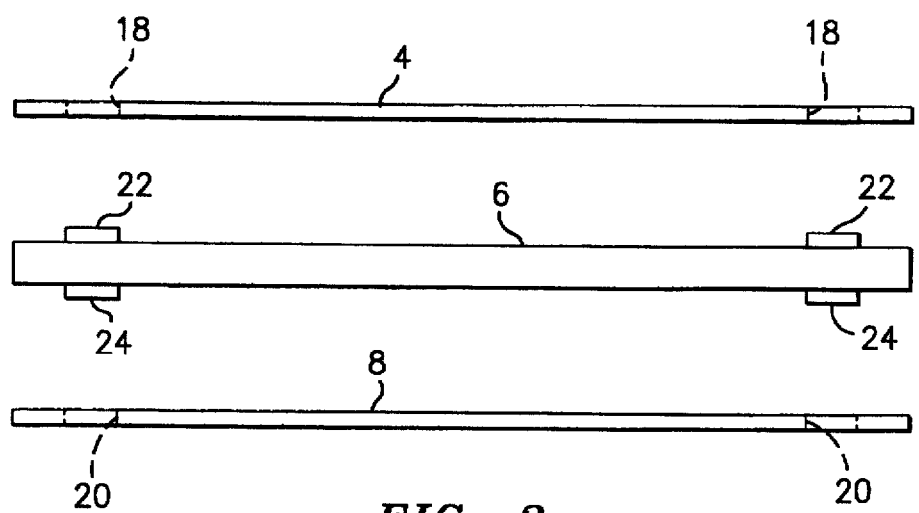
FIG. 2 is a bottom view of the three plate components of the device prior to assembly.

The plates 4 and 8 are fabricated with identically located holes 18 and 20 respectively. The plate 6, as shown in FIG. 2, is fabricated with posts 22 and 24 which are aligned with the holes 18 and 20 respectively. The posts 22 fit into the holes 18, and the posts 24 fit into the holes 20, thereby holding the plates 4, 6, and 8 in proper alignment, thus making unnecessary an assembly fixture to align parts while they are assembled. The three plates 4, 6, and 8 are preferably fixed together by rigid, inelastic, shrink plastic sleeves 26 fitted onto the legs 10, 12, and 14. The inelasticity of sleeve 26 give full effect to the aforementioned spring action of the plates 4 and 8.

Figure 3:
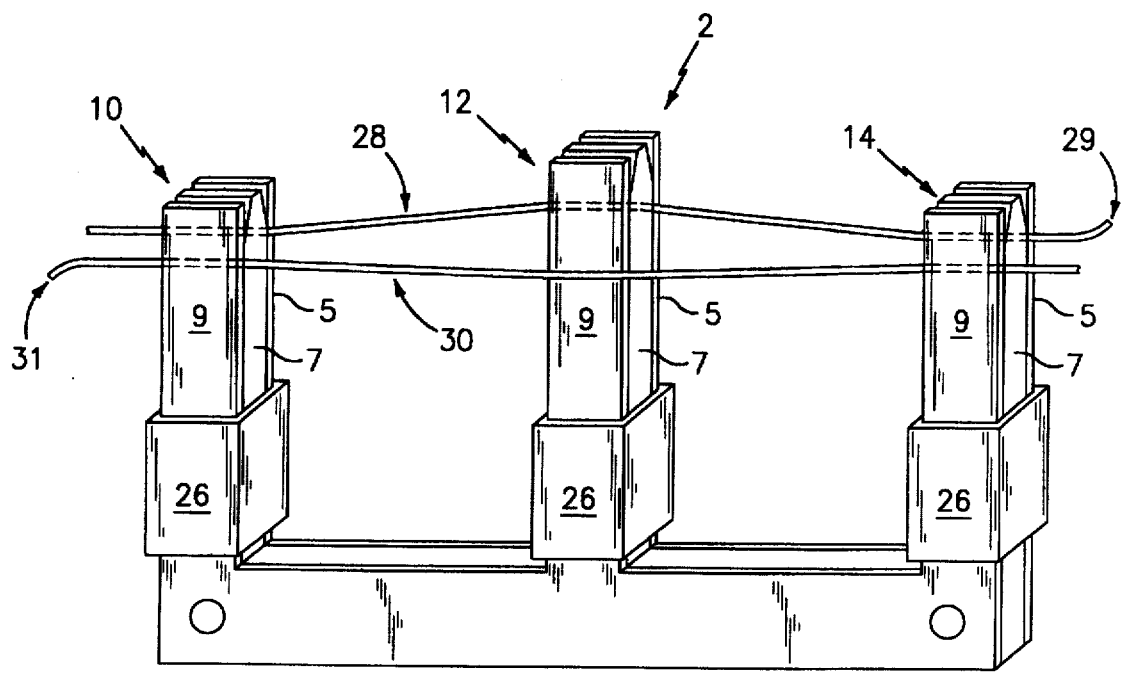
FIG. 3 illustrates two leader segments clamped in position, ready to be tied together.
Figure 4:
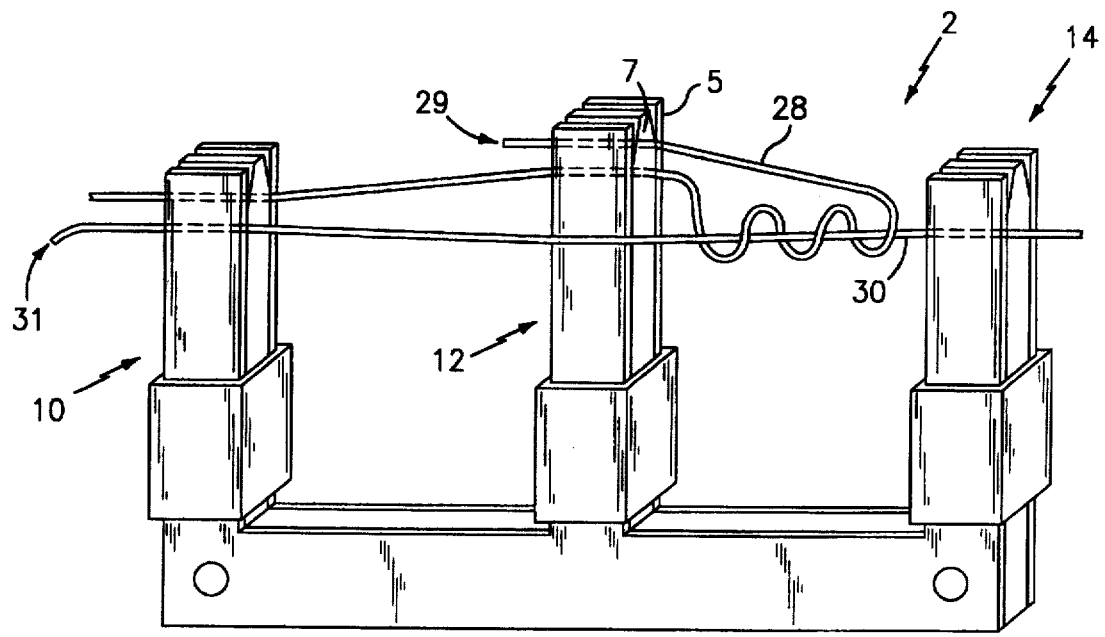
FIGS. 4–6 illustrates the manner in which the leader segments are manipulated in the device to form a blood knot.
Figure 5:
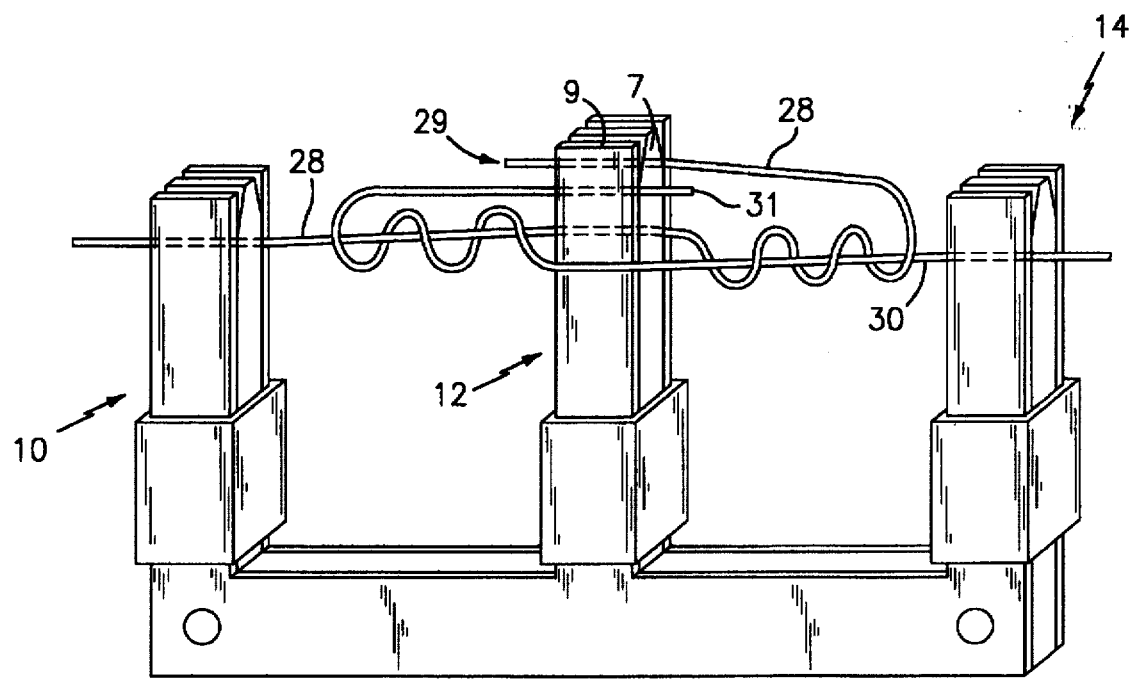

FIGS. 3-6 illustrate the manner in which monofilament segments 28 and 30 are manipulated in the device 2 to form a blood knot. It will be understood that the numeral 29 refers to the free end of the monofilament segment 28, and that the numeral 31 refers to the free end of the monofilament segment 30. FIG. 3 illustrates the segments 28 and 30 positioned in the ready-to-tie position. More specifically, the monofilament segment 28 is wedged between the plate legs 5 and 7 of the device 2 legs 10 and 14 having skirted to the rear of the device 2 leg 12, and the monofilament segment 30 is wedged between the plate legs 9 and 7 of the device 2 legs 10 and 14 having skirted to the front of the device leg 12. Preferably the center leg 12 of the device 2 is longer than the end legs 10 and 14 so as to assure that the line segments 28 and 30 being tied together do not slip over the top of the center leg during the tying process. FIG. 4 shows how the free end 29 of the monofilament segment 28 is released from its initial holding position in leg 14 of the device 2, then wound around monofilament segment 30, and then wedged between the plates 5 and 7 in the central leg 12 of the device 2. Then, as shown in FIG. 5, the free end of monofilament segment 30 is released from its holding position in the leg 10 of the device 2 and is then wound around monofilament segment 28, and then wedged between the plates 7 and 9 in the central leg 12 of the device 2. These manipulations are easy to accomplish by hand, and the coils are not disposed to unwind, which is a shortcoming with some device of the prior art. Furthermore, the monofilament can be wound around in either direction that one chooses, such option being important to some persons. It will be noted from FIG. 5 that the monofilament segments 28 and 30 straddle the central leg 12 and that their respective free ends 29 and 31 are gripped by the central leg 12.

Figure 6:
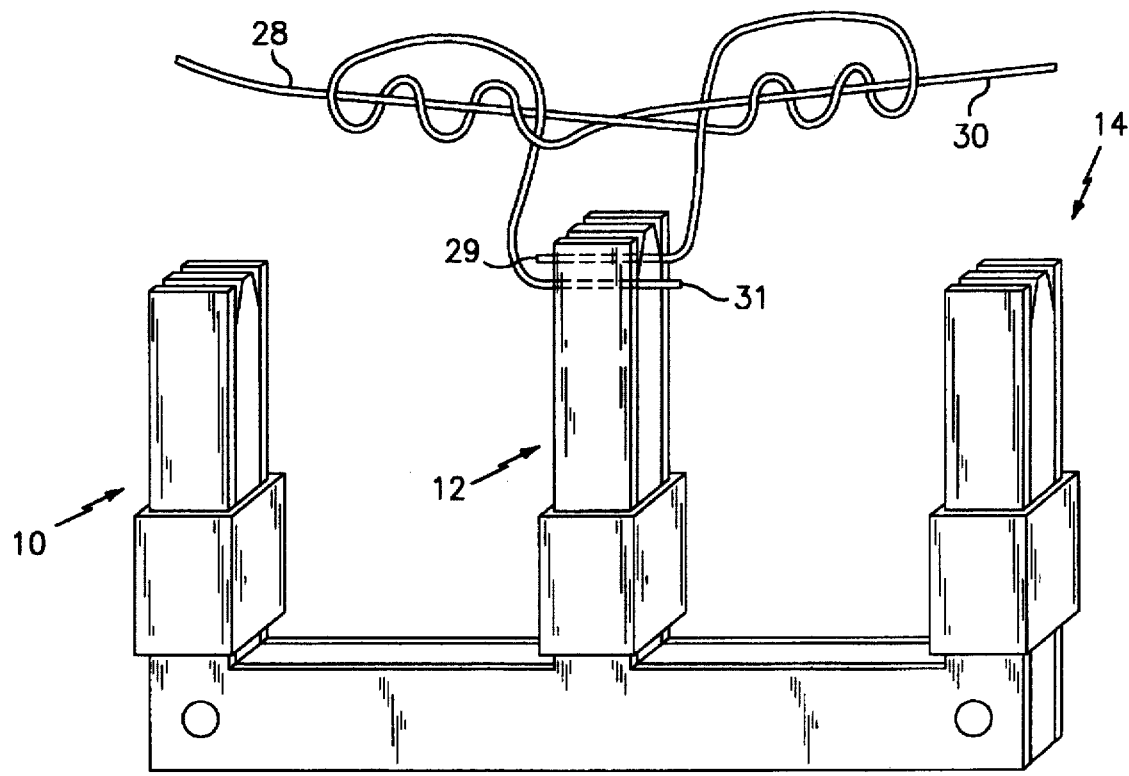
Figure 7:
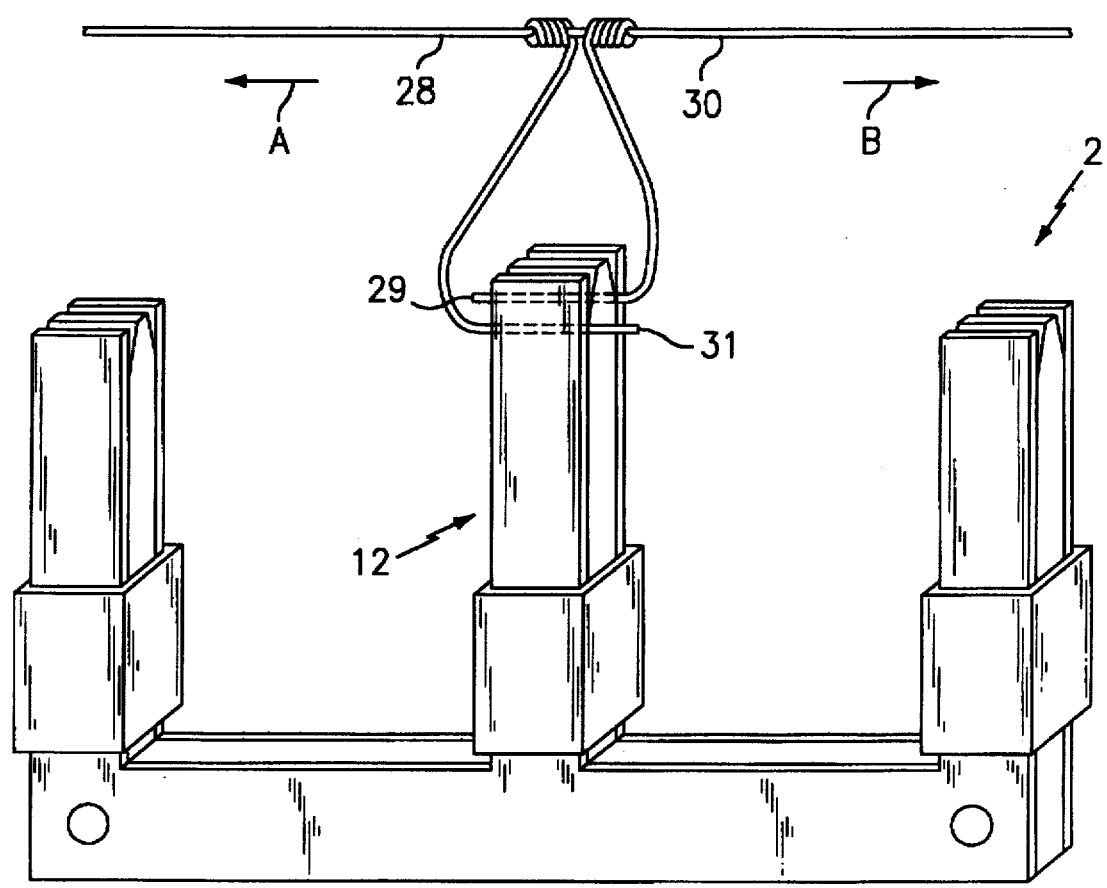
FIG. 7 illustrates the manner in which the blood knot is tightened.

FIG. 6 illustrates that the monofilament segments 28 and 30 are lifted out of the legs 10 and 14, while their free ends 29 and 31 remain captured by the central leg 12. This produces a loose form of the blood knot being tied. FIG. 7 illustrates that, following the formation of the loose knot as shown in FIG. 6, the monofilament segments 28 and 30 are pulled in opposite directions, as indicated by arrows A and B, while the free ends 29 and 31 of the segments 28 and 30 remain captured by the central leg 12. This tightens the knot as shown in FIG. 7. The monofilament 29 and 31 are then pulled out of their holding place in central legs 12 and snipped off to a proper length, thus completing the knot.

It will be readily appreciated that the device of this invention is rugged and durable and simple to manufacture. The outer plates are stamped out of sheet metal, the shrink plastic tubing is readily obtainable from industrial suppliers, and the inner plate is easily made by injection molding techniques. The device is easy to use at home or in the field and does not require difficult manual operations to tie blood knots.

Since many changes and variations of the disclosed embodiment of the invention may be made without departing from the inventive concept, it is not intended to limit the invention otherwise than as required by the appended claims.

What is claimed is:

1. A device for tying together separate segments of monofilament or similarly fine line with a fisherman's knot such as a blood knot, said device comprising:

a) two like configured outer plates, each of said outer plates including a basal part, two end leg parts extending from said basal part at right angles thereto, and one medial leg part extending from said basal part at right angles thereto; and b) an inner plate sandwiched between said outer plates, said inner plate having a basal portion interposed between the basal parts of said outer plates, and said inner plate having two end leg portions and one medial leg portion extending from said basal portion at right angles thereto and being sandwiched between said leg parts of said outer plates, said inner plate leg portions combining with said outer plate leg parts to form spaced-apart clamps for clamping one of the separate segments of line between the end leg parts of one outer plate and the end leg portions on one side of the inner plate and for clamping the other segment of line between the end leg parts of the other outer plate and the end leg portions of the opposite side of the inner plate, and said medial leg parts of said outer plates combining with said medial leg portions of said inner plate to clamp free ends of the line segments during the formation of a knot.

2. The device of claim 1 wherein at least one surface at the tangency of inner leg portions and outer leg parts has a tapered free end to facilitate inserting the line segments into each of said spaced-apart clamps.

3. The device of claim 1 wherein said medial leg parts and portions are longer than said end leg parts and portions so as to prevent the free ends of the line segments being tied together from unintentionally sliding over the top of said medial leg parts and portions during the formation of a knot.

4. The device of claim 1 wherein inter-plate alignment is achieved by cylindrical protrusions disposed on opposite sides of said inner plate, which protrusions extend into corresponding openings of said outer plates, said cylindrical protrusions and openings mating upon assembly of the device.

5. The device of claim 1 wherein assembly of said plates is achieved by fastening means sufficiently rigid to hold firm said plates and thereby make operative spring clamping action between said outer plate leg parts and said inner plate leg portions.

6. The device of claim 5 wherein said fastening means comprises sleeves of inelastic shrinkable plastic.

* * * * *